(12) United States Patent
Choi et al.

(10) Patent No.: US 10,440,704 B2
(45) Date of Patent: Oct. 8, 2019

(54) METHOD AND DEVICE FOR ALLOCATING RESOURCE UNITS IN WIRELESS LAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 15/523,234

(22) PCT Filed: Nov. 2, 2015

(86) PCT No.: PCT/KR2015/011635
§ 371 (c)(1),
(2) Date: Apr. 28, 2017

(87) PCT Pub. No.: WO2016/068669
PCT Pub. Date: May 6, 2016

(65) Prior Publication Data
US 2017/0339673 A1     Nov. 23, 2017

Related U.S. Application Data

(60) Provisional application No. 62/073,964, filed on Nov. 1, 2014.

(51) Int. Cl.
*H04W 72/04*     (2009.01)
*H04W 72/12*     (2009.01)
(Continued)

(52) U.S. Cl.
CPC ............ *H04W 72/044* (2013.01); *H04L 5/00* (2013.01); *H04L 5/0048* (2013.01);
(Continued)

(58) Field of Classification Search
CPC ............ H04W 72/04; H04W 72/0406; H04W 72/042; H04W 72/044; H04W 72/121; H04W 72/1278; H04W 72/1289
See application file for complete search history.

(56) References Cited

U.S. PATENT DOCUMENTS

2010/0260114 A1    10/2010    Vermani et al.
2011/0216723 A1    9/2011    Sartori et al.
(Continued)

OTHER PUBLICATIONS

"IEEE Standard 802.11ac™-2013", The Institute of Electrical and Electronics Engineers, Inc., Dec. 2013, 6 pages.
(Continued)

*Primary Examiner* — Ashley Shivers
(74) *Attorney, Agent, or Firm* — Birch, Stewart, Kolasch & Birch, LLP

(57) ABSTRACT

A method and a device for allocating resource units in a wireless LAN are disclosed. The method for allocating resource units in a wireless LAN comprises the steps of: generating, by an AP, a PPDU to be transmitted to a plurality of STAs; and transmitting, by the AP, the PPDU to the plurality of STAs on the whole frequency band, wherein the PPDU includes resource allocation information, the resource allocation information includes first resource unit allocation information for allocating first resource units and second resource unit allocation information for allocating second resource units, the first resource unit allocation information is information relating to the allocation of the first resource units for at least one first STA, among the plurality of STAs, which is to receive the PPDU through the first resource units on the whole frequency band, the second resource unit allocation information is information relating to the allocation of the second resource units for at least one second STA, among the plurality of STAs, which is to receive the PPDU through the second resource units on the whole frequency band, and the number of tones allocated to the first resource units can be larger than the number of tones allocated to the second resource units.

10 Claims, 14 Drawing Sheets

(51) Int. Cl.
*H04L 5/00* (2006.01)
*H04W 84/12* (2009.01)

(52) U.S. Cl.
CPC ......... *H04W 72/04* (2013.01); *H04W 72/042* (2013.01); *H04W 72/121* (2013.01); *H04W 72/1289* (2013.01); *H04W 84/12* (2013.01)

(56) References Cited

U.S. PATENT DOCUMENTS

| | | | |
|---|---|---|---|
| 2012/0218983 A1 | 8/2012 | Noh et al. | |
| 2016/0021678 A1* | 1/2016 | Merlin ............... | H04W 72/1268 370/329 |
| 2016/0066338 A1* | 3/2016 | Kwon .................... | H04L 5/0007 370/330 |
| 2016/0080043 A1* | 3/2016 | Tian ....................... | H04B 7/022 375/267 |

OTHER PUBLICATIONS

Fujitsu, "eNB controlled resource allocation for D2D2 broadcast", R1-142933, 3GPP TSG-RAN1 #78, Dresden, Germany, Aug. 2014, 7 pages.

Samsung, "Utilization of multiple resource pools based on RSRP for type-1 discovery", R1-143867, 3GPP TSG RAN WG1 Meeting #78bis, Ljubljana, Slovenia, Oct. 2014, 7 pages.

* cited by examiner

FIG. 1
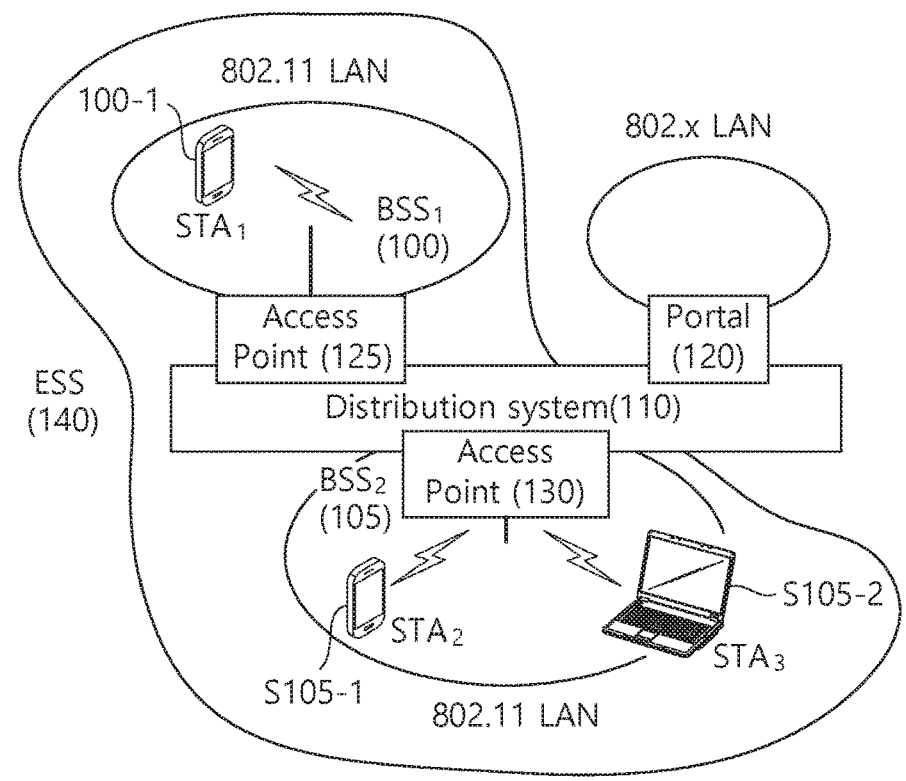
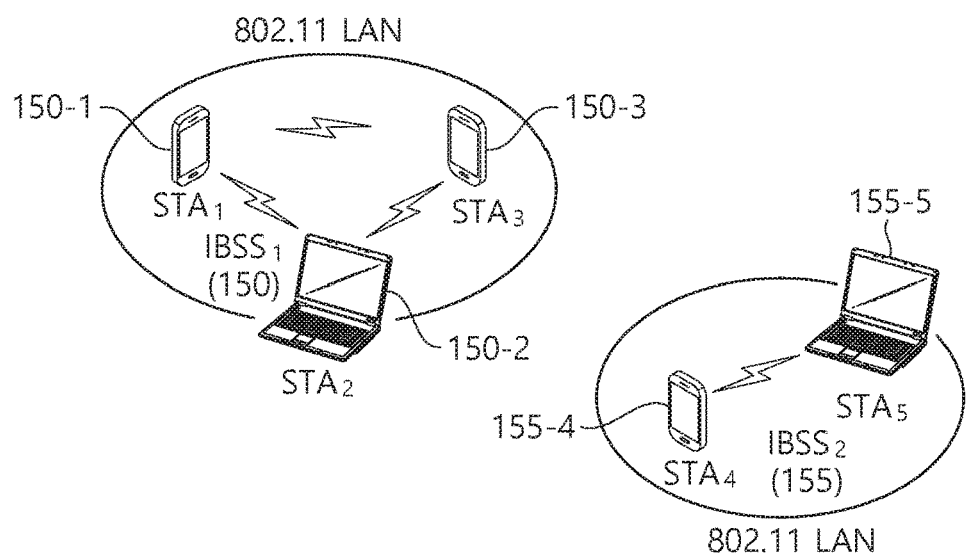

METHOD AND DEVICE FOR ALLOCATING RESOURCE UNITS IN WIRELESS LAN

CROSS REFERENCE TO RELATED APPLICATIONS

This application is the National Phase of PCT International Application No. PCT/KR2015/011635, filed on Nov. 2, 2015, which claims priority under 35 U.S.C. 119(e) to U.S. Provisional Application No. 62/073,964, filed on Nov. 1, 2014, all of which are hereby expressly incorporated by reference into the present application.

BACKGROUND OF THE INVENTION

Field of the Invention

The present invention relates to wireless communication and, most particularly, to a method and device for allocating resource units in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for allocating resource units in a wireless LAN.

Another object of the present invention is to provide a device for allocating resource units in a wireless LAN.

Technical Solutions

In order to achieve the above-described technical object of the present invention, according to an aspect of the present invention, a method for allocating resource units in a wireless LAN may include the steps of generating, by an access point (AP), a PHY layer protocol data unit (PPDU) that is to be transmitted to a plurality of stations (STAs), and transmitting, by the AP, the PPDU to the plurality of STAs within an entire frequency bandwidth, wherein the PPDU may include resource allocation information, wherein the resource allocation information may include first resource unit allocation information for allocation of first resource units and second resource unit allocation information for allocation of second resource units, wherein the first resource unit allocation information may correspond to information associated with allocation of the first resource units corresponding to at least one first STA that is to receive the PPDU, among the plurality of STAs, through the first resource unit within the entire frequency bandwidth, wherein the second resource unit allocation information may correspond to information associated with allocation of the second resource units corresponding to at least one second STA that is to receive the PPDU, among the plurality of STAs, through the second resource unit within the entire frequency bandwidth, and wherein a number of tones being allocated to the first resource unit may be greater than a number of tones being allocated to the second resource unit.

In order to achieve the above-described technical object of the present invention, according to another aspect of the present invention, an access point (AP) allocating resource units in a wireless LAN may include a radio frequency (RF) unit transmitting and receiving radio signals, and a processor being operatively connected to the RF unit, wherein the processor may be configured to generate a PHY layer protocol data unit (PPDU) that is to be transmitted to a plurality of stations (STAs), and to transmit the PPDU to the plurality of STAs within an entire frequency bandwidth, wherein the PPDU may include resource allocation information, wherein the resource allocation information may include first resource unit allocation information for allocation of first resource units and second resource unit allocation information for allocation of second resource units, wherein the first resource unit allocation information may correspond to information associated with allocation of the first resource units corresponding to at least one first STA that is to receive the PPDU, among the plurality of STAs, through the first resource unit within the entire frequency bandwidth, wherein the second resource unit allocation information may correspond to information associated with allocation of the second resource units corresponding to at least one second STA that is to receive the PPDU, among the plurality of STAs, through the second resource unit within the entire frequency bandwidth, and wherein a number of tones being allocated to the first resource unit may be greater than a number of tones being allocated to the second resource unit.

Effects of the Invention

When allocating resource units for a plurality of STAs based on orthogonal frequency division multiple access (OFDMA), resource allocation to each of the plurality of STAs may be performed by using wireless resource units each defined to have a different size. Accordingly, scheduling flexibility may be enhanced, and throughput of the wireless LAN may be increased.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
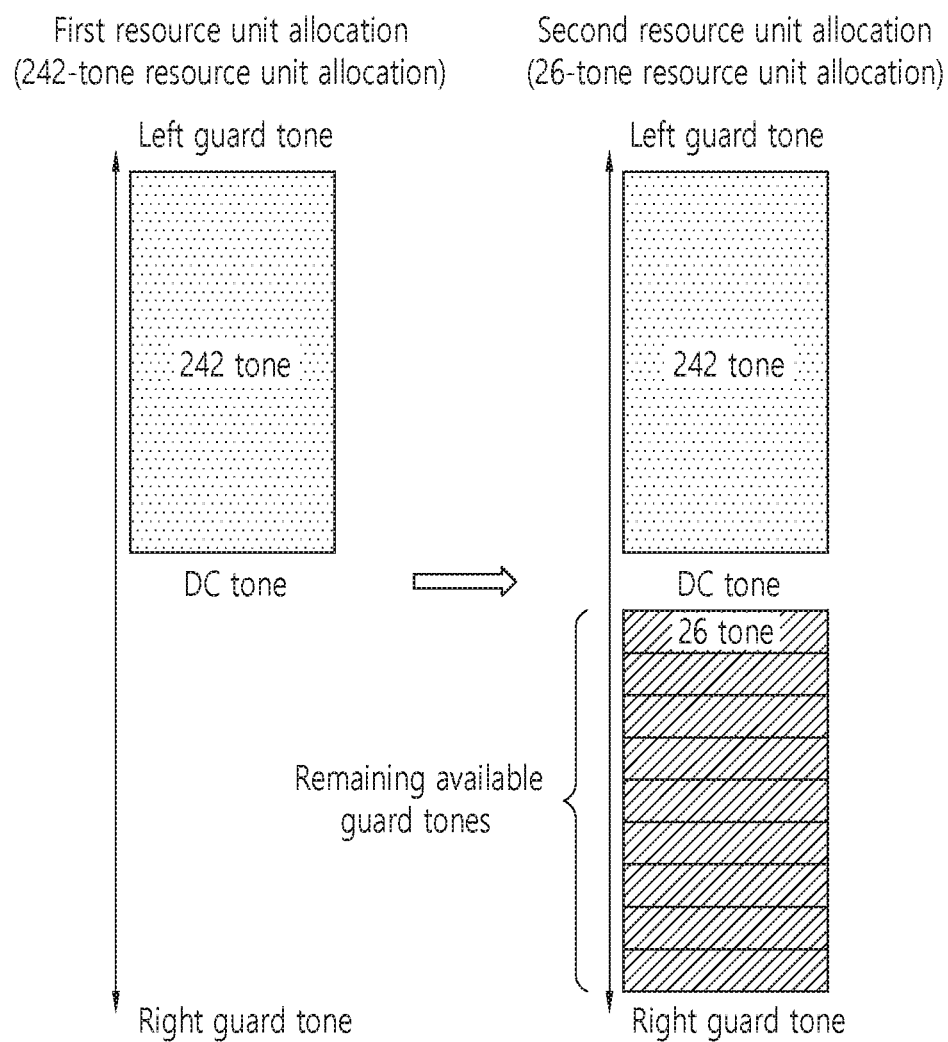
FIG. 2 is a conceptual view illustrating a method for allocating resource units within a bandwidth according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared with the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

In case of the OFDMA based resource allocation method according to the exemplary embodiment of the present invention, resource allocation units each defined to have a different size may be used. More specifically, a basic resource unit for the OFDMA based resource allocation may be defined as a resource unit of 26 tones and a resource unit of 242 tones. For example, a resource unit of 26 tones may include a data tone of 24 tones and a pilot tone of 2 tones. A resource tone of 242 tones may include a data tone of 234 tones and a pilot tone of 8 tones. By applying an interleaver having a size of 234 to the resource unit of 242 tones, and by applying an interleaver having a size of 24 to the resource unit of 26 tones, interleaving may be performed on the data tone. A tone may be interpreted to have the same meaning as a subcarrier.

A number of pilot tones/data tones and allocation positions that are based on the 242-tone numerology of the conventional IEEE 802.11ac may be applied to the basic resource unit of 242 tones. The number of pilot tones/data tones and allocation positions that are based on the 242-tone numerology of the conventional IEEE 802.11ac are disclosed in 22.3.10.10 Pilot subcarriers of IEEE Standard for Information technology telecommunications and information exchange between systems local and metropolitan area networks specific requirements 'Part 11: Wireless LAN Medium Access Control(MAC) and Physical Layer (PHY) Specifications Amendment 4: Enhancements for Very High Throughput for Operation in Bands below 6 GHz.

The 242-tone resource unit may correspond to a virtual allocation resource unit. The virtual allocation resource unit may be generated based on a combination of resource units that are smaller than the virtual allocation resource unit. For example, the 242-tone resource unit may correspond to a combination of a plurality of 26-tone resource units and additional leftover tones or a combination of 121-tone resource units. The virtual allocation resource unit may correspond to a resource unit for re-using an interleaver size and OFDM numerology (or tone numerology) of the conventional wireless LAN system.

A number of pilot tones/data tones and allocation positions that are based on the 26-tone numerology of the conventional IEEE 802.11ah may be applied to the basic resource unit of 26 tones. The number of pilot tones/data tones and allocation positions that are based on the 26-tone numerology of the conventional IEEE 802.11ah are disclosed in 24.3.9.10 Pilot subcarriers of EEE P802.11ah™/D5.0 Draft Standard for Information technology telecommunications and information exchange between systems Local and metropolitan area network specific requirements 'Part 11: Wireless LAN Medium Access Control (MAC) and Physical Layer (PHY) Specifications Amendment 2: Sub 1 GHz License Exempt Operation'.

The AP may determine a downlink transmission resource and/or an uplink transmission resource for at least one STA based on resource units each having a different size, as described above. The AP may transmit at least one PPDU to at least one STA through the scheduled downlink transmission resource. Additionally, the AP may receive at least one PPDU that is transmitted by at least one STA through the scheduled uplink transmission resource.

The basic resource unit may be allocated within the entire bandwidth (or available bandwidth) while considering a left guard tone and a left guard tone, which are respectively positioned on each end of the entire bandwidth for interference mitigation, and a direct current (DC) tone, which is positioned at a center of the bandwidth. Moreover, the basic resource unit may also be allocated while considering left-over tones (or remaining tones) that may be used for the purpose of user allocation separation (or per STA resource allocation), common pilot, automatic gain control (AGC), phase tracking, and so on.

The allocation method (allocation number, allocation location, etc.) of the basic resource unit within the entire bandwidth may be configured by considering resource application efficiency, scalability (or extendibility) according to the entire bandwidth. The allocation method of the basic resource unit may be defined in advance or may be signaled based on diverse methods (e.g., signaling based on a signal field that is included in a PPDU header of a PPDU).

Hereinafter, a detailed resource allocation method that is based on the basic resource unit will be disclosed.

According to the exemplary embodiment of the present invention, the tone numerology corresponding to each of the bandwidths of 20 MHz, 40 MHz, and 80 MHz may be as described below. The following resource allocation method corresponding to each bandwidth is merely exemplary, and, therefore, resource allocation within each bandwidth may be performed by using diverse methods in addition to the method that is described above.

In the 20 MHz bandwidth, the left guard tone may be defined as 6 tones, the direct current (DC) tone may be defined as 3 tones, and the right guard tone may be defined as 5 tones. In the 20 MHz bandwidth, resource allocation within the bandwidth may be performed based on a 26-tone resource unit and/or a 242-tone resource unit.

In the 40 MHz bandwidth, the left guard tone may be defined as 6 tones, the DC tone may be defined as 9 tones, and the right guard tone may be defined as 5 tones. In the 40 MHz bandwidth, 492 tones are available for usage, and the resource allocation within the bandwidth may be performed based on a 26-tone resource unit and/or a 242-tone resource unit on the 492 tones.

In the 40 MHz bandwidth, the left guard tone may be defined as 6 tones, the DC tone may be defined as 5 tones, and the right guard tone may be defined as 5 tones. In the 40 MHz bandwidth, 496 tones are available for usage, and the resource allocation within the bandwidth may be performed based on a 26-tone resource unit and/or a 242-tone resource unit on the 496 tones.

In the 80 MHz bandwidth, the left guard tone may be defined as 11 tones, the DC tone may be defined as 3 tones, and the right guard tone may be defined as 10 tones. In the 80 MHz bandwidth, 1000 tones are available for usage, and the resource allocation within the bandwidth may be performed based on a 26-tone resource unit and/or a 242-tone resource unit on the 1000 tones.

In the 80 MHz bandwidth, the left guard tone may be defined as 6 tones, the DC tone may be defined as 5 tones, and the right guard tone may be defined as 5 tones. In the 80 MHz bandwidth, 1008 tones are available for usage, and the resource allocation within the bandwidth may be performed based on a 26-tone resource unit and/or a 242-tone resource unit on the 1008 tones.

Although description of the leftover tone is not indicated on the drawing for simplicity, the leftover tone may be positioned between the 26-tone resource unit and the 242-tone resource unit.

FIG. 2 is a conceptual view illustrating a method for allocating resource units within a bandwidth according to an exemplary embodiment of the present invention.

Referring to FIG. 2, in the OFDMA based resource allocation method, the 242-tone resource unit may be allocated firsthand to the available tones, and, then, the 26-tone resource unit(s) may be allocated to the remaining available tones after allocating the 242-tone resource unit.

A number of allocations and allocation positions that are available in each bandwidth for the 242-tone resource unit may be defined in advance. For example, the number of 242-tone resource units being allocated for each of the 20 MHz, 40 MHz, or 80 MHz bandwidths and allocation positions of the 242-tone resource unit corresponding to the number of 242-tone resource units that are being allocated may be defined in advance. In case the number of allocations and allocation positions of the 242-tone resource unit are determined for each bandwidth, the number of allocations and allocation positions of the 26-tone resource units that are to be allocated to the remaining available bandwidths may be then be determined. In case none of the 242-tone resource units is allocated for each bandwidth, the corresponding allocation positions and number of allocations of the 26-tone resource units may be fixed.

Figure 3:
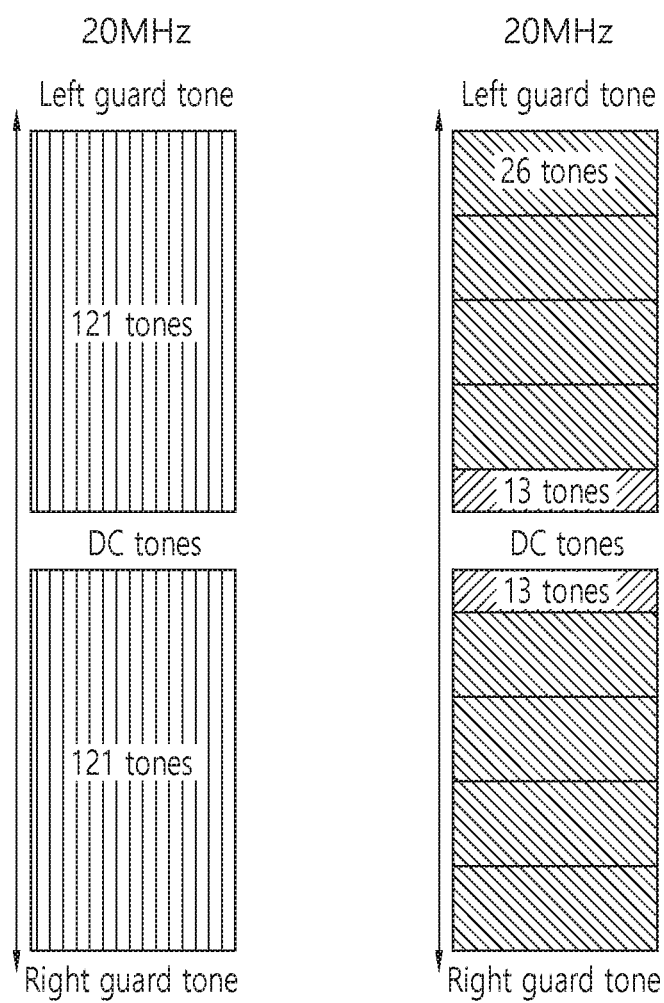
FIG. 3 is a conceptual view illustrating an allocation of resource units within a 20 MHz bandwidth according to the exemplary embodiment of the present invention.

FIG. 3 is a conceptual view illustrating an allocation of resource units within a 20 MHz bandwidth according to the exemplary embodiment of the present invention.

FIG. 3 discloses the allocation of 242-tone resource units/26-tone resource units within a 20 MHz bandwidth.

Referring to a left side of FIG. 3, one 242-tone resource unit may be allocated to the available tones within the 20 MHz bandwidth. The available tones may correspond to the remaining tones after excluding the left guard tone, the right guard tone, and the DC tone. The 242-tone resource unit may correspond to a combination of two 121-tone divided resource units based on the DC tone.

One 242-tone resource unit may be allocated to one STA within the 20 MHz bandwidth. One 242-tone resource unit may be allocated to one STA within the 20 MHz bandwidth for a single user (SU) based transmission. In case one 242-tone resource unit is allocated to one STA within the 20 MHz bandwidth, separate resource allocation information may not be included in a header of a PPDU. Also, in case a MU OFDMA transmission is not performed, and in case resources for a plurality of STAs are multiplexed and allocated to one 242-tone resource unit for MU-MIMO transmission, separate resource allocation information may not be included in a header of a PPDU. In this case, information on the number of STAs being allocated for MU-MIMO may be included in the header of a PPDU. An STA may know that one 242-tone resource unit has been allocated to one STA within the 20 MHz bandwidth based only on information on the size of the entire bandwidth (e.g., 20 MHz) and information on an STA being allocated within the entire bandwidth (information indicating that only the STA has been allocated within the entire bandwidth).

Referring to a right side of FIG. 3, only 26-tone resource units may be used for the resource allocation corresponding to each of the plurality of STAs without any allocation of 242-tone resource units. For example, one STA may be allocated with at least one 26-tone resource unit within the 20 MHz bandwidth.

A maximum of 9 26-tone resource units may be allocated within the 20 MHz bandwidth. In case each of the 9 26-tone resource units are allocated to each of the plurality of STAs, one STA may be allocated with one 26-tone resource unit. More specifically, in case a 26-tone resource unit is allocated, resource may be simultaneously allocated to a maximum of 9 STAs within the 20 MHz bandwidth. One 26-tone resource unit may be divided into two 13-tone divided resource units based on the DC tone.

The allocation positions of each of the plurality of (e.g., 9) 26-tone resource units within the 20 MHz bandwidth may be fixed, and each of the plurality of 26-tone resource units may be sequentially allocated to individual STAs based on resource unit allocation signaling (or signaling indication).

Figure 4:
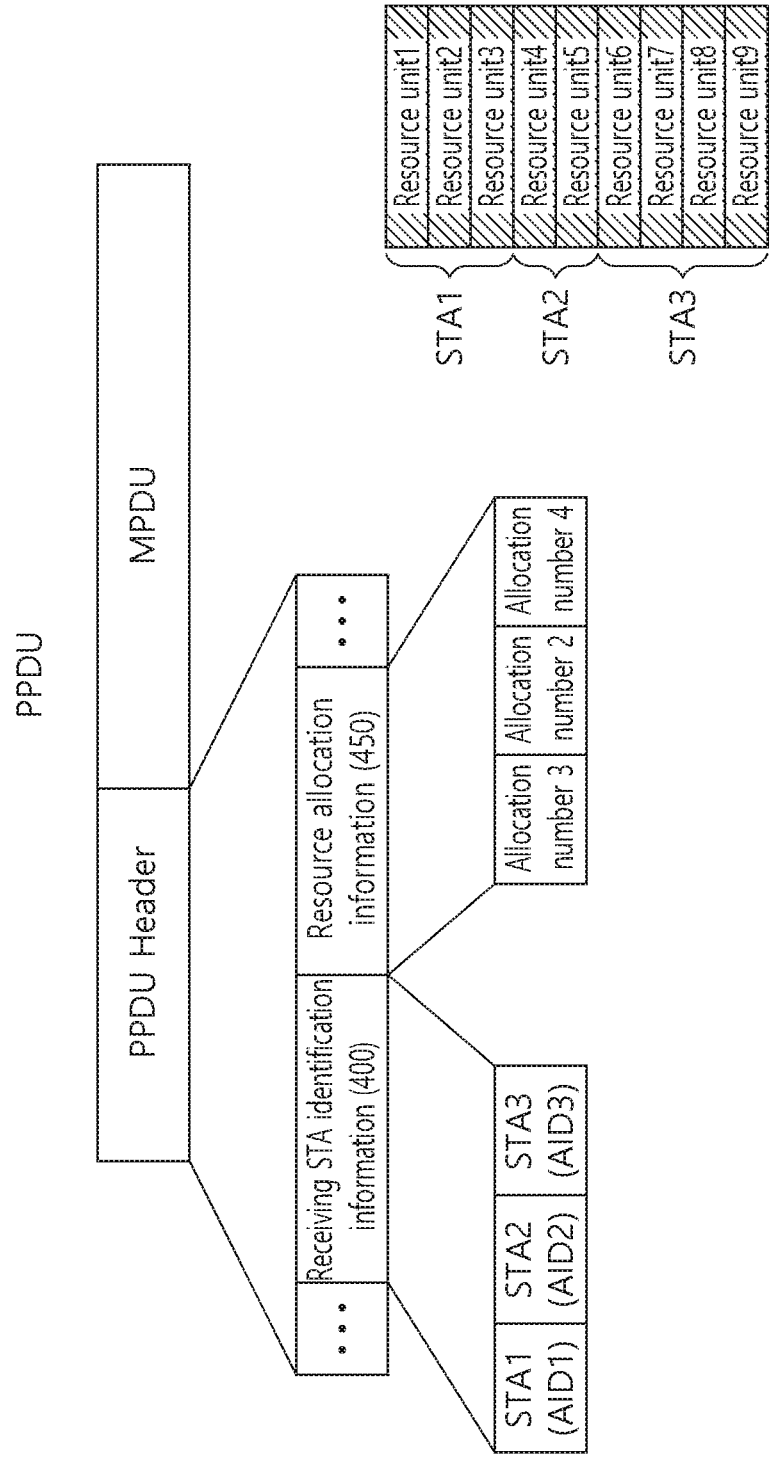
FIG. 4 is a conceptual view illustrating a signaling method for performing allocation of resource units according to the exemplary embodiment of the present invention.

FIG. 4 is a conceptual view illustrating a signaling method for performing allocation of resource units according to the exemplary embodiment of the present invention.

FIG. 4 discloses a method for allocating resource units to STAs based on identification information corresponding to a STA receiving a PPDU and information on the number of resource units being allocated to the STA.

Referring to FIG. 4, the PPDU header may include information on the plurality of STAs that are to receive the PPDU (receiving STA identification information 400) and information on the resource units that are allocated to each of the plurality of STAs for the reception of the PPDU (resource allocation information 450). The receiving STA identification information 400 may sequentially include identification information (e.g., association identifier (AID)) corresponding to each of the plurality of STAs. The resource allocation information 450 may sequentially include information on the number of resource units that are allocated to each of the plurality of STAs.

Each of the plurality of STAs being indicated by the receiving STA identification information 400 may correspond to information on the number of resource units being allocated to each of the plurality of STAs being sequentially included in the resource allocation information 450. Each of the plurality of STAs that are sequentially indicated by the receiving STA identification information may be allocated with the resource units that are sequentially aligned on a frequency axis based on the information on the number of resource units being allocated to each of the plurality of STAs.

For example, a case when nine resource units (resource unit1 to resource unit9) are sequentially allocated on the frequency axis, and when the receiving STA identification information sequentially indicates STA1, STA2, and STA3, and when the resource allocation information sequentially indicates three, two, and four units may be assumed. In this case, STA1 may be allocated with three resource units, STA2 may be allocated with two resource units, and STA3 may be allocated with four resource units. At this point, resource unit1 to resource unit9 may be sequentially allocated to each of STA1, STA2, and STA3 by considering the number of resource units being allocated to each of STA1, STA2, and STA3. More specifically, STA1 may be allocated with resource unit1, resource unit2, and resource unit3, and STA2 may be allocated with resource unit4 and resource unit5, and STA3 may be allocated with resource unit6, resource unit7, resource units, and resource unit9.

More specifically, each of the plurality of resource units sequentially positioned on the frequency axis may be continuously (or contiguously) allocated to each of the plurality of STAs based on the receiving STA identification information including information on the plurality of STAs that are to sequentially receive the PPDU and the resource allocation information including information on the number of resource units sequentially allocated to each of the plurality of STAs.

Hereinafter, in the exemplary embodiment of the present invention, the resource allocation method may also be expressed differently as a resource allocation method that is based on resource unit allocation signaling/signaling indication. The resource allocation method that is based on resource unit allocation signaling/signaling indication may indirectly indicate the resource units that are sequentially allocated to each of the plurality of STAs without any direct indication on the resource units being allocated to each of the plurality of STAs.

Figure 5:
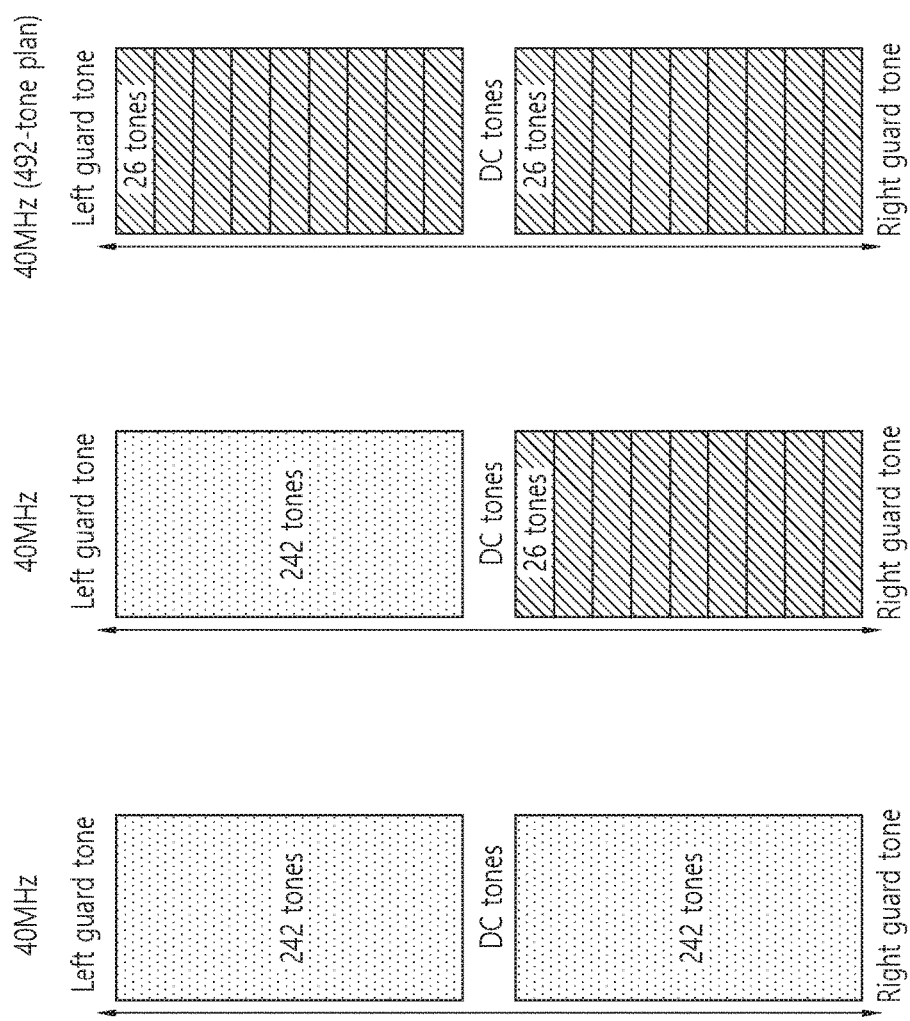
FIG. 5 is a conceptual view illustrating an allocation of resource units within a 40 MHz bandwidth according to the exemplary embodiment of the present invention.

FIG. 5 is a conceptual view illustrating an allocation of resource units within a 40 MHz bandwidth according to the exemplary embodiment of the present invention.

FIG. 5 discloses the allocation of 242-tone resource units/26-tone resource units within a 40 MHz bandwidth.

Referring to a first drawing from a left side of FIG. 5, two 242-tone resource units may be allocated to the available tones within the 40 MHz bandwidth.

Two 242-tone resource units may be allocated to one STA within the 40 MHz bandwidth. More specifically, two 242-tone resource units may be allocated to one STA within the 40 MHz bandwidth for a SU based transmission. In case two 242-tone resource units are allocated to one STA within the 40 MHz bandwidth, separate resource allocation information may not be included in a header of a PPDU. Also, in case a MU OFDMA transmission is not performed, and in case resources for a plurality of STAs are multiplexed and allocated to two 242-tone resource units for MU-MIMO transmission, separate resource allocation information may not be included in a header of a PPDU. In this case, information on the number of STAs being allocated for MU-MIMO may be included in the header of a PPDU. An STA may know that both of the two 242-tone resource unit have been allocated within the 40 MHz bandwidth based only on information on the size of the entire bandwidth (e.g., 40 MHz) and information on an STA being allocated within the entire bandwidth (information indicating that only the STA has been allocated within the entire bandwidth).

Each of the two 242-tone resource units may be respectively allocated to each of two STAs within the 40 MHz bandwidth. The 26-tone resource unit may not be used for the allocation of resource units. As described above, two STAs may be respectively allocated with each of the two 242-tone resource units based on a sequential resource unit allocation signaling within the PPDU header.

Referring to a second drawing from the left side of FIG. 5, one 242-tone resource unit is allocated to the available tones within the 40 MHz bandwidth, and a plurality of 26-tone resource units may be allocated to the remaining available tones. One 242-tone resource unit may be allocated to one STA, and the remaining plurality of 26-tone resource units may be allocated to at least one STA. For example, 9 26-tone resource units may be allocated to the remaining available tones. Each of the 9 26-tone resource units may be allocated to each of at least one of a maximum 9 STAs.

In case the above-described resource allocation is performed within the 40 MHz bandwidth, the allocation position of the 242-tone resource unit and the allocation positions corresponding to each of the plurality of 26-tone resource units may be fixed.

Each of the 242-tone resource unit and the plurality of 26-tone resource units may be individually allocated, and the plurality of 26-tone resource units may be allocated to a plurality of STAs based on resource unit allocation signaling.

Referring to a third drawing from the left side of FIG. 5, resource allocation may be performed based only on the allocation of the 26-tone resource units without performing allocation of the 242-tone resource unit to the available tones of the 40 MHz bandwidth.

For example, in case the number of available tones is equal to 492 tones (a 492-tone plan), based on the DC tone, 9 26-tone resource units may be allocated between the DC tone and the left guard tone, and 9 26-tone resource units may be allocated between the DC tone and the right guard tone. More specifically, a total of 18 26-tone resource units may be allocated on the frequency axis.

Additionally, as another example, in case the number of available tones is equal to 496 tones (a 496-tone plan), a total of 19 26-tone resource units may be allocated on the frequency axis. One 26-tone resource unit may be divided into two 13-tone divided resource unit. Based on the DC tone, 9 26-tone resource units+13-tone resource unit may be allocated between the DC tone and the left guard tone, and 9 26-tone resource units+13-tone resource unit may be allocated between the DC tone and the right guard tone. More specifically, a total of 19 26-tone resource units may be allocated on the frequency axis FIG. 6 is a conceptual view illustrating an allocation of resource units within an 80 MHz bandwidth according to the exemplary embodiment of the present invention.

Figure 6:
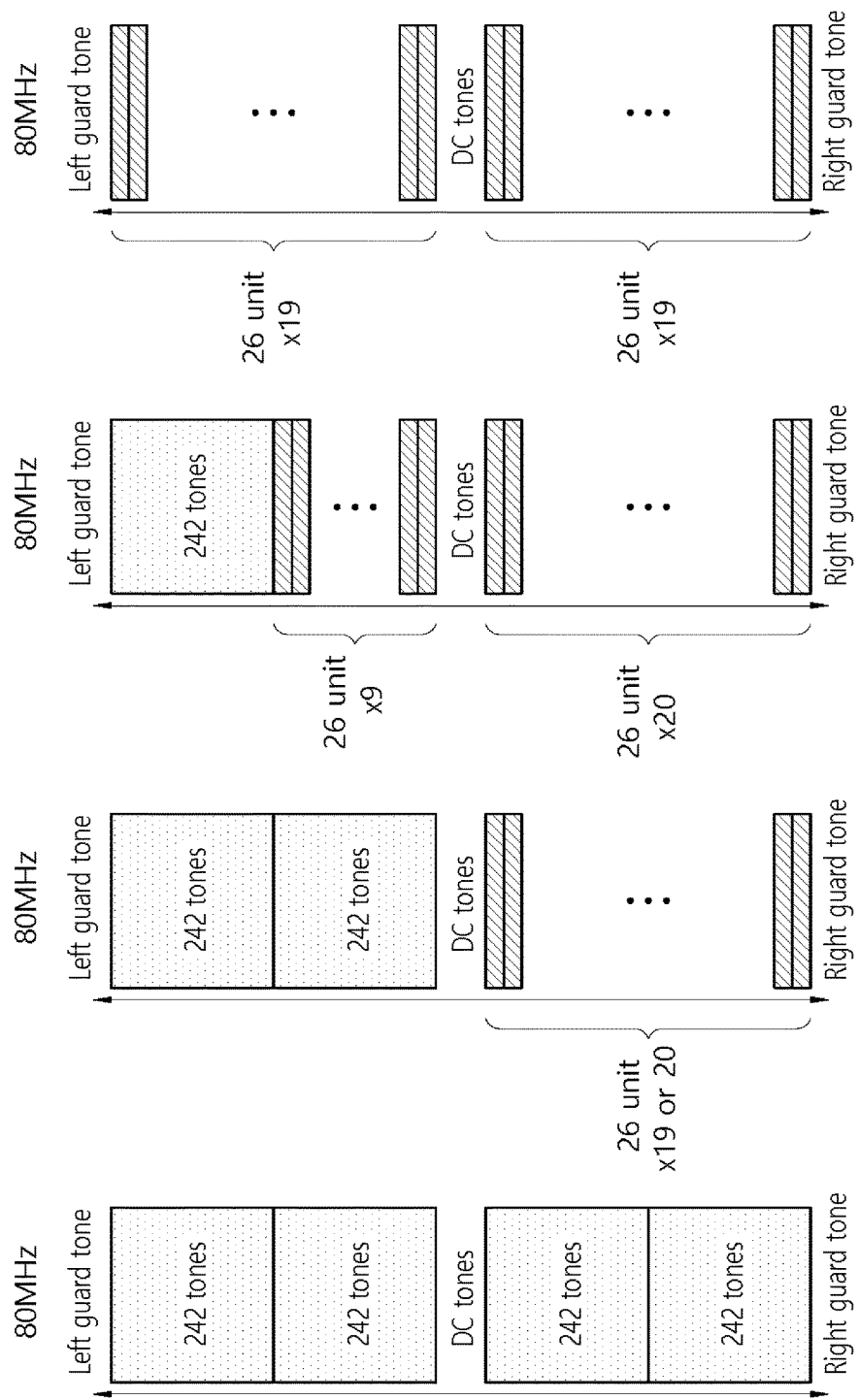
FIG. 6 is a conceptual view illustrating an allocation of resource units within an 80 MHz bandwidth according to the exemplary embodiment of the present invention.

FIG. 6 discloses the allocation of 242-tone resource units/26-tone resource units within an 80 MHz bandwidth.

Referring to a first drawing from a left side of FIG. 6, four 242-tone resource units may be allocated to the available tones within the 80 MHz bandwidth. Four 242-tone resource units may be allocated to one STA within the 80 MHz bandwidth. Four 242-tone resource units may be allocated to one STA within the 80 MHz bandwidth for a SU based transmission. In case a MU OFDMA transmission is not performed, and in case resources for a plurality of STAs are multiplexed and allocated to four 242-tone resource units for MU-MIMO transmission, separate resource allocation information may not be included in a header of a PPDU. In this case, information on the number of STAs being allocated for MU-MIMO may be included in the header of a PPDU. In case four 242-tone resource units are allocated to one STA within the 80 MHz bandwidth, separate resource allocation information may not be included in a header of a PPDU. An STA may know that all of the four 242-tone resource unit have been allocated within the 80 MHz bandwidth based only on information on the size of the entire bandwidth (e.g., 40 MHz) and information on an STA being allocated within the entire bandwidth (information indicating that only the STA has been allocated within the entire bandwidth).

Alternatively, a resource unit including two 242-tone resource units may be separately allocated to each of the two STAs within the 80 MHz bandwidth. More specifically, two 242-tone resource units may be allocated to STA1, and two 242-tone resource units may be allocated to STA2. The 26-tone resource unit may not be used for the allocation of resource units. As described above, two STAs may be respectively allocated with a resource unit including two 242-tone resource units based on a sequential resource unit allocation signaling within the PPDU header.

Referring to a second drawing from the left side of FIG. 6, each of two 242-tone resource units is respectively allocated to each of the STAs, and each of the plurality of 26-tone resource units being allocated to the remaining available tones may be allocated to other plurality of STAs.

In case the number of available tones within the 80 MHz bandwidth is equal to 1000 tones (a 1000-tone plan) 19 26-tone resource units may be allocated to the remaining available tones. In this case, a maximum of 19 STAs may be serviced by being allocated with the 19 26-tone resource units.

In case the number of available tones within the 80 MHz bandwidth is equal to 1008 tones (a 1008-tone plan) 20 26-tone resource units may be allocated to the remaining available tones. In this case, a maximum of 20 STAs may be serviced by being allocated with the 20 26-tone resource units.

Referring to a third drawing from the left side of FIG. 6, one 242-tone resource unit may be allocated to one STA within the 80 MHz bandwidth, and each of the plurality of 26-tone resource units being allocated to the remaining available tones may be allocated to other plurality of STAs. 29 26-tone resource units may be allocated to the remaining available tones excluding the one 242-tone resource unit, and each of the 29 26-tone resource units may be allocated to each of a maximum of 29 STAs.

Referring to a fourth drawing from the left side of FIG. 6, resource allocation that is based only on 26-tone resource units without any 242-tone resource units may be performed within the 80 MHz bandwidth. In this case, 38 26-tone resource units may be allocated within the 80 MHz bandwidth, and each of the 38 26-tone resource units may be allocated to each of a maximum of 38 STAs.

Hereinafter, allocation methods corresponding to each of the 242-tone resource unit and the 26-tone resource unit will be disclosed in the exemplary embodiment of the present invention.

Figure 7:
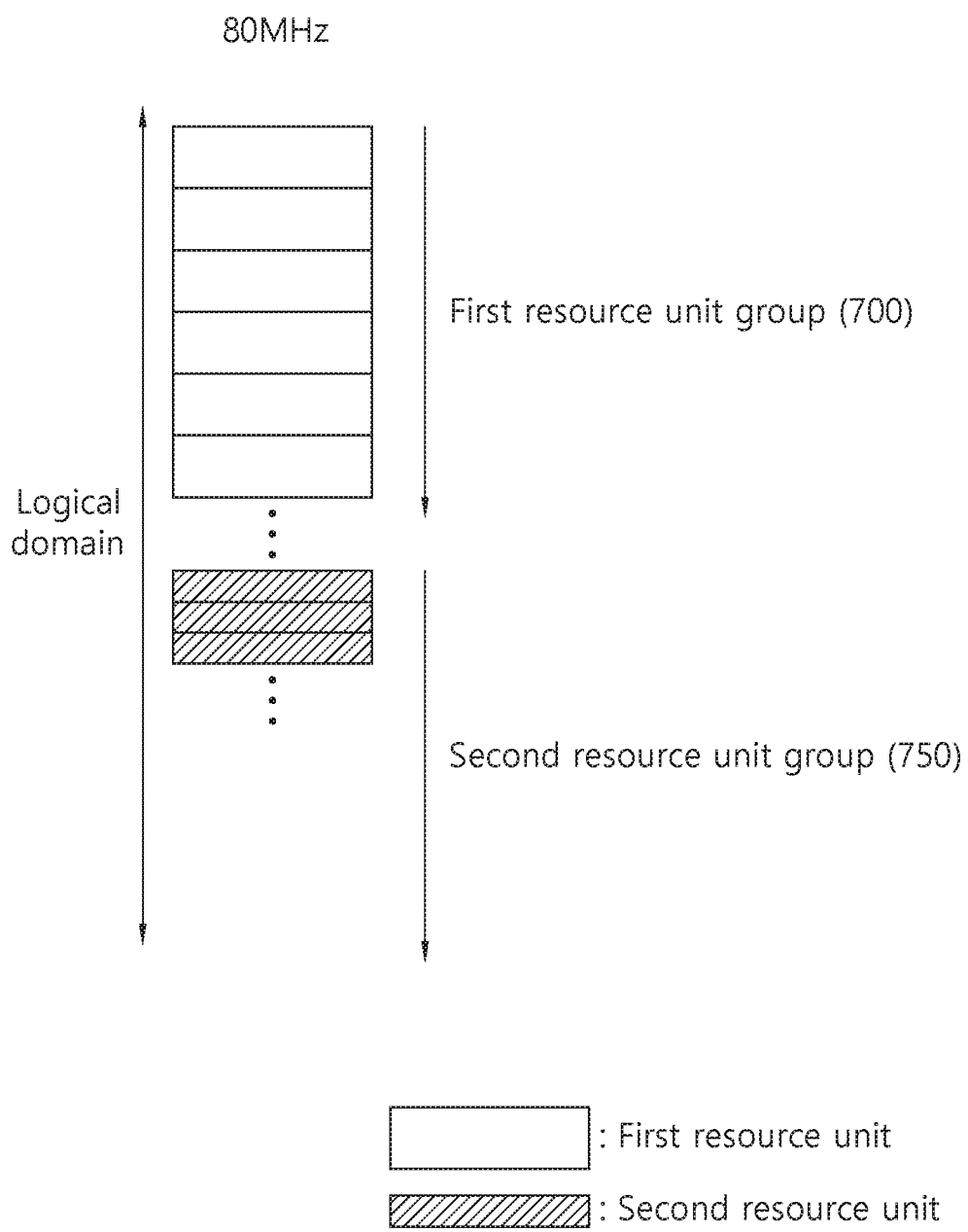
FIG. 7 is a conceptual view illustrating a method for performing resource unit scheduling according to an exemplary embodiment of the present invention.

FIG. 7 is a conceptual view illustrating a method for performing resource unit scheduling according to an exemplary embodiment of the present invention.

FIG. 7 discloses a method for effectively signaling information on the allocation of two resource units each having a different size.

Referring to FIG. 7, information on the allocation of resource units may be transmitted based on logical grouping of resource units having the same size. For example, at least one 242-tone resource unit being allocated within the bandwidth may be grouped as a first resource unit group 700. And, at least one 26-tone resource unit being allocated within the bandwidth may be grouped as a second resource unit group 750.

A resource unit (e.g., 242-tone resource unit) that is included in the first resource unit group 700 may also be expressed differently by using the term first resource unit (or basic resource unit (BRU)), and a resource unit (e.g., 26-tone resource unit) that is included in the second resource unit group 750 may also be expressed differently by using the term second resource unit (or irregular resource unit (IRU)).

Each of the plurality of grouped resource units may be aligned (or ordered) based on the size of the allocated frequency bandwidth. For example, a plurality of 242-tone resource units included in the first resource unit group 700 may be ordered by an increasing (or decreasing) order of the allocated frequency, or individual indexes may be allocated in accordance with the ordering. Similarly, a plurality of 26-tone resource units included in the second resource unit group 750 may be ordered by an increasing (or decreasing) order of the allocated frequency, or individual indexes may be allocated in accordance with the ordering.

In a logical domain, the first resource unit group 700, which corresponds to a group of first resource units having a relatively larger size, may be positioned firsthand, and, then, the second resource unit group 750, which corresponds to a group of second resource units having a relatively smaller size, may be positioned afterwards.

In performing the resource allocation, the first resource units included in the first resource unit group 700 may be allocated with higher priority, and, then, the second resource units included in the second resource unit group 750 may be allocated afterwards. More specifically, the allocation of the 242-tone resource units may be carried out with higher priority, and, then, the allocation of the 26-tone resource units may be carried out to the remaining available tones. Afterwards. The order for allocating the resource units may be varied in accordance with the system environment and the situation of the supported traffic.

The number of 26-tone resource units may be pre-defined in advance, as shown below in the following table, in accordance with the number of 242-tone resource units that are allocated.

TABLE I

| Number of allocated 242-tone resource units | 20 MHz Number of allocated 26-tone resource units | 40 MHz Number of allocated 26-tone resource units | 80 MHz Number of allocated 26-tone resource units |
|---|---|---|---|
| 0 | 9 | 18 (492-tone plan) or 19 (496-tone plan) | 38 |
| 1 | 0 | 9 | 29 |
| 2 | N/A | 0 | 19 (1000-tone plan) or 20 (1008-tone plan) |
| 4 | N/A | N/A | 1 |

Referring to Table 1, the number of 26-tone resource units that can be allocated for each bandwidth may be pre-defined in advance in accordance with the number of allocated 242-tone resource units.

Resource unit allocation signaling may be sequentially performed based on Table 1, which is presented above. For example, in case 1 242-tone resource unit is allocated within a 40 MHz bandwidth, 9 26-tone resource unit may be allocated. Among the 9 26-tone resource units, the STA may be allocated with at least one of the 26-tone resource units based on the resource unit allocation signaling. As another example, in case 1 242-tone resource unit is allocated within an 80 MHz bandwidth, among 29 26-tone resource units that are allocated, the STA may be allocated with at least one of the 26-tone resource units based on the resource unit allocation signaling.

The resource unit allocation signaling may be performed for each of the first resource unit group 700 and second resource unit group 750. Resource allocation information corresponding to the allocation of the first resource units included in the first resource unit group 700 and resource allocation information corresponding to the allocation of the second resource units included in the second resource unit group 750 may be separately transmitted. In other words, the resource unit allocation signaling may be separately performed for each of the first resource unit group 700 and the second resource unit group 750.

The resource allocation information corresponding to the first resource unit group 700 may be associated with the resource allocation information corresponding to the second resource unit group 750. As described above, in case the number and/or position of the first resource units being allocated to the frequency axis is/are determined, the number and/or position of the second resource units being allocated to the frequency axis may be subordinately determined.

The resource allocation information corresponding to the first resource unit group 700 may be transmitted to each of the STAs being allocated with the 242-tone resource unit through an HE-SIG-B (e.g., a first symbol of the HE-SIG B) within a PPDU header. An HE-SIG A that is included in the PPDU header may include common information, and an HE-SIG B that is included in the PPDU header may include STA-specific information. More specifically, the resource allocation information corresponding to the first resource unit group 700 may be transmitted through the HE-SIG B as STA-specific information.

Alternatively, the resource allocation information corresponding to the first resource unit group 700 may be transmitted through the HE-SIG-A within the PPDU header. Thus, other STAs being allocated with second resource units included in the second resource unit group 750 may also decode the HE-SIG-A and may determine the second resource units, which are allocated based on the resource allocation information corresponding to the first resource unit group 700. More specifically, the resource allocation information corresponding to the first resource unit group 700 may be transmitted as common information through the HE-SIG-A, thereby being received not only by the STA that is allocated with the 242-tone resource unit but also by other STAs.

Figure 8:
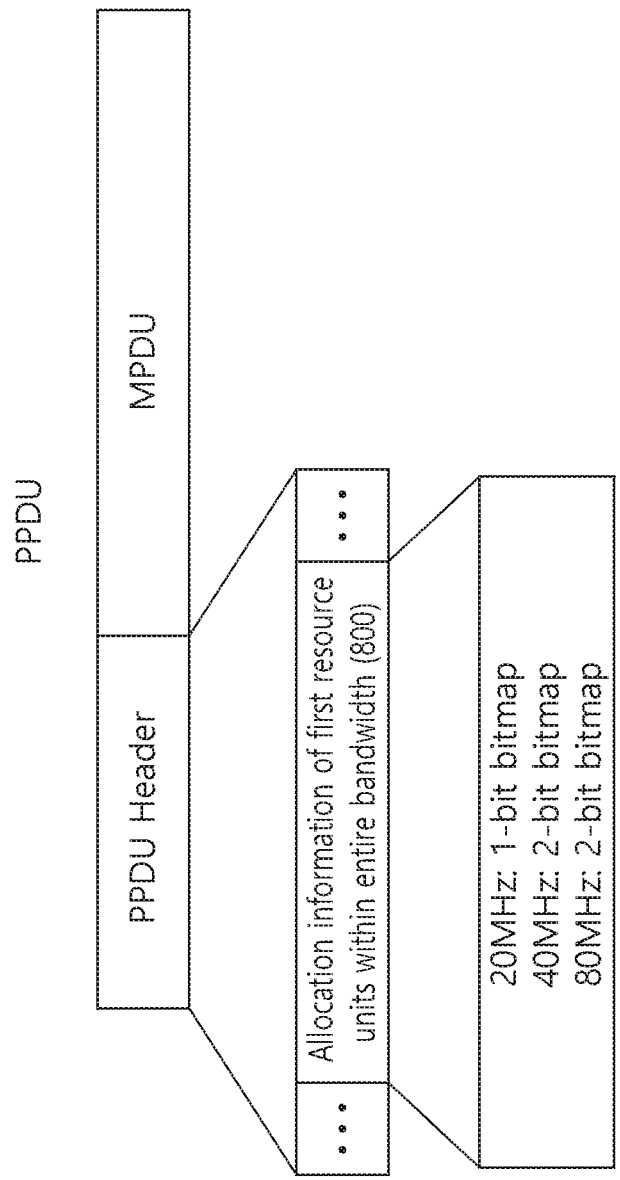
FIG. 8 is a conceptual view illustrating a method for performing resource unit scheduling according to an exemplary embodiment of the present invention.

FIG. 8 is a conceptual view illustrating a method for performing resource unit scheduling according to an exemplary embodiment of the present invention.

FIG. 8 discloses a resource allocation method corresponding to the first resource unit group (or 242-tone resource units).

According to the exemplary embodiment of the present invention, a size of a bitmap that has a different size in accordance with the size of the bandwidth may be defined. For example, the PPDU header may include information on the allocation of first resource units (e.g., number of allocated first resource units) 800 within the entire bandwidth.

Referring to FIG. 8, a 1-bit bitmap or signaling bit corresponding to the 20 MHz bandwidth may include information on the allocation of one 242-tone resource unit.

A 2-bit bitmap or signaling bit corresponding to the 40 MHz bandwidth may include information on the allocation of 242-tone resource units. For example, the 2-bit bitmap or signaling bit may indicate whether the number of allocated 242-tone resource units within the 40 MHz bandwidth is equal to 0, 1, or 2. Alternatively, the information on the allocation of 242-tone resource units may also indicate 242-tone units or 484-tone units.

A 2-bit bitmap or signaling bit corresponding to the 80 MHz bandwidth may include information on the allocation of 242-tone resource units. For example, the 2-bit bitmap or signaling bit may indicate whether the number of allocated 242-tone resource units within the 80 MHz bandwidth is equal to 1, 2, or 4. Alternatively, the information on the allocation of 242-tone resource units may also indicate 242-tone units, 484-tone units, or 996-tone units.

Alternatively, according to another exemplary embodiment of the present invention, a bitmap including information corresponding to the allocation of 242-tone resource units each being defined to have the same size regardless of the size of the bandwidth. The size of the bitmap including information corresponding to the allocation of 242-tone resource units may be defined as 2 bits, and the 2-bit bitmap may indicate a number of allocated 242-tone resource unit being allocated to each of the 20 MHz, 40 MHz, and 80 MHz bandwidths.

Figure 9:
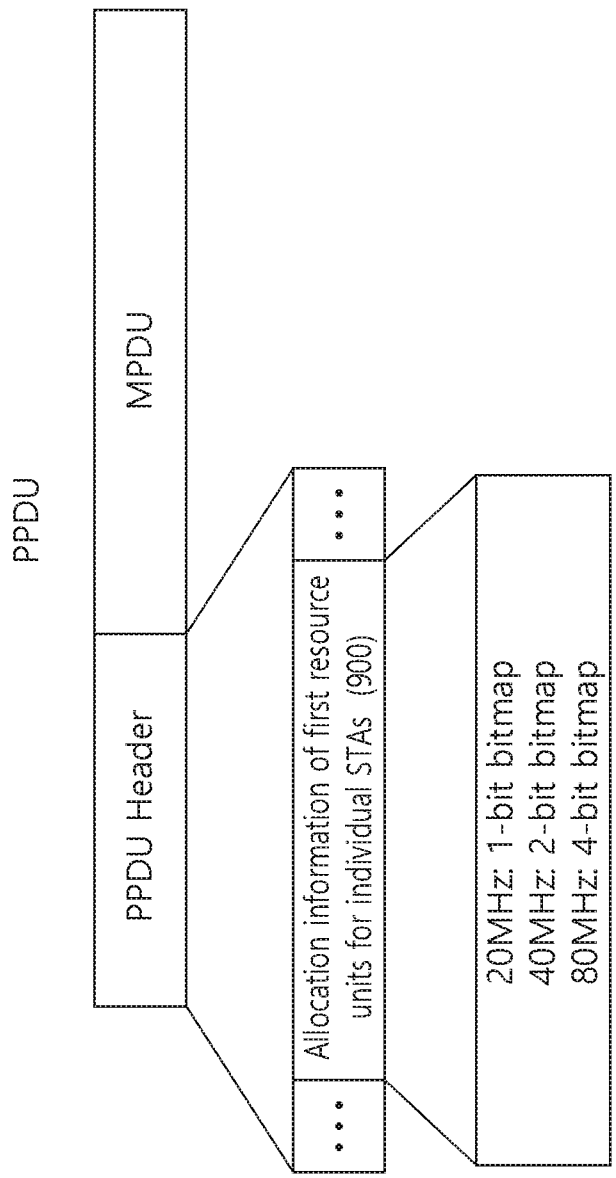
FIG. 9 is a conceptual view illustrating a method for performing resource unit scheduling according to an exemplary embodiment of the present invention.

FIG. 9 is a conceptual view illustrating a method for performing resource unit scheduling according to an exemplary embodiment of the present invention.

FIG. 9 discloses a method of indicating allocation of the first resource unit group (242-tone resource units) to STAs. In case the allocation of the 242-tone resource units to each STA is defined differently for each bandwidth size, the allocation of the 242-tone resource units to each STA may be indicated by using the method that will be described below. For example, the PPDU header may include information on the allocation of first resource units to individual STAs (e.g., number of allocated first resource units) 900.

Referring to FIG. 9, 1 bit may be used within the 20 MHz bandwidth as resource allocation information corresponding to the first resource unit group (242-tone resource units). Therefore, whether or not 242-tone resource units are being allocated to the STA may be indicated based only on the 1-bit resource allocation information. For example, in case the 1-bit resource allocation information indicates '1', allocation of the 242-tone resource units to the STA may be indicated.

2 bits may be used within the 40 MHz bandwidth as the resource allocation information corresponding to the first resource unit group. Two 242-tone resource units may be allocated within the 40 MHz bandwidth. One 242-tone resource unit (first 242-tone resource unit) may be allocated along a direction of the left guard tone based on the DC tone, and another 242-tone resource unit (second 242-tone resource unit) may be allocated along a direction of the right guard tone based on the DC tone. Therefore, among the two 242-tone resource units, the allocated 242-tone resource units may be indicated based on the 2-bit resource allocation information. For example, in case the 2-bit resource allocation information indicates '10', this may indicate that the first 242-tone resource unit is allocated to the STA.

4 bits may be used within the 80 MHz bandwidth as the resource allocation information corresponding to the first resource unit group. Four 242-tone resource units may be allocated within the 80 MHz bandwidth. Two 242-tone resource units (first 242-tone resource unit and second 242-tone resource unit) may be allocated along a direction of the left guard tone based on the DC tone, and two other 242-tone resource units (third 242-tone resource unit and fourth 242-tone resource unit) may be allocated along a direction of the right guard tone based on the DC tone. Therefore, among the four 242-tone resource units, the allocated 242-tone resource units may be indicated based on the 4-bit resource allocation information. For example, in case the 4-bit resource allocation information indicates '1100', this may indicate that the first 242-tone resource unit and the second 242-tone resource unit are allocated to the STA.

According to the exemplary embodiment of the present invention, resource allocation information corresponding to the STA may be transmitted based on a 4-bit bitmap regardless of the bandwidth size. For example, the resource allocation information may be transmitted to the STA based on a 4-bit bitmap of the HE-SIG B.

As described above, in case the STA knows a start offset (or start position on the frequency axis) of its allocated resource units by using identification information of the STA, such as AID, and so on, the STA may know the positions of its allocated resource units by only using the information on the number of allocated resource units.

Figure 10:
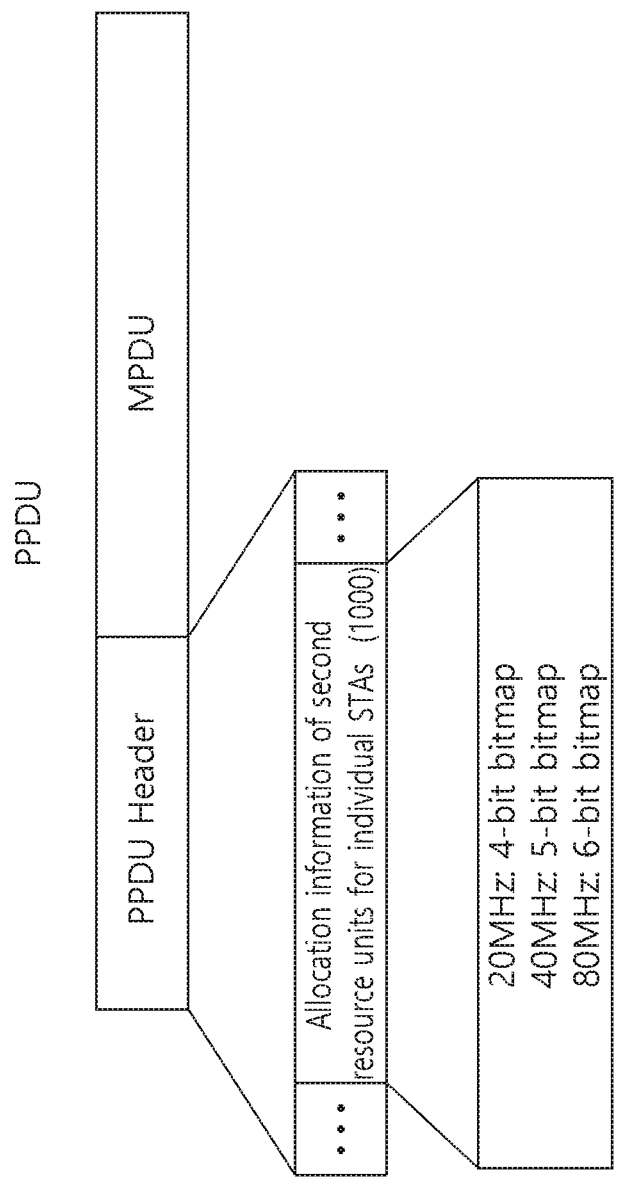
FIG. 10 is a conceptual view illustrating a method for performing resource unit scheduling according to an exemplary embodiment of the present invention.

FIG. 10 is a conceptual view illustrating a method for performing resource unit scheduling according to an exemplary embodiment of the present invention.

FIG. 10 discloses an allocation method of the second resource unit group (26-tone resource units) to the STA. In case the allocation of the 26-tone resource units to each STA is defined differently for each bandwidth size, the allocation of the 26-tone resource units to each STA may be indicated by using the method that will be described below.

A case when a maximum number of 26-tone resource units may be allocated to one STA on the frequency axis will hereinafter be assumed. In case the number of 26-tone resource units that can be allocated varies within the frequency axis, the size of the bitmap may also vary. For example, in case the number of 26-tone resource units that can be allocated within the frequency axis varies based on the number of allocated 242-tone resource units, the size of the bitmap for the 26-tone resource units may vary.

In case continuous resource unit allocation is only authorized, as described above, indication of the resource units being allocated to the STA may be performed by using the information on the start offset of the resource unit being allocated to the STA and information on the number of allocated resource units being allocated to the STA, the start offset of the resource unit may indicate a position where the allocation of the resource unit starts. The information on the start offset of the resource unit being allocated to the STA may be determined based on information on an identifier of an STA being allocated with 26-tone resource units. More specifically, as described above, in case the resource unit is allocated by considering an order of identifier information (e.g., AID) of at least one STA being allocated with resource units on the frequency axis, the STA may know the start position of the resource unit being allocated to the STA based on the identifier information.

If a non-continuous resource unit allocation is authorized, 26-tone resource units being allocated to the STA may be indicated based on a bitmap that can indicate each of the total 26-tone resource units that can be allocated on the frequency axis.

In case the STA knows the start offset information for the resource allocation corresponding to the STA based on the identifier information, FIG. 10 discloses a method of notifying the information on the number of resource units being allocated to the STA. FIG. 10 discloses a case when the bit size corresponding to the information on the number of allocated resource units varies in accordance with the bandwidth size.

For example, the PPDU header may include information on the allocation of second resource units to individual STAs (e.g., number of allocated second resource units) 1000.

Referring to FIG. 10, a 4-bit bitmap or signaling bit corresponding to the 20 MHz bandwidth may be used for indicating an allocation of 1 to 9 resource units to the STA.

A 5-bit bitmap or signaling bit corresponding to the 40 MHz bandwidth may be used for indicating an allocation of 1 to 18 (or 19) resource units to the STA.

A 6-bit bitmap or signaling bit corresponding to the 80 MHz bandwidth may be used for indicating an allocation of 1 to 38 resource units to the STA.

The STA may be allocated with a number of resource units that are indicated based on the information on the number of resource units, which is based on the start offset of the resource units that are to be allocated.

A lower part of FIG. 10 discloses a case when a bit size corresponding to information of the resource units being allocated in accordance with the bandwidth size does not vary. A 6-bit bitmap or signaling bit may indicate the number of 26-tone resource units being allocated to the frequency axis.

According to another exemplary embodiment of the present invention, information on the position and number of 26-tone resource units that are being allocated may be notified in one session by using a bitmap or signaling bit corresponding to the total number of 26-tone resource units.

Figure 11:
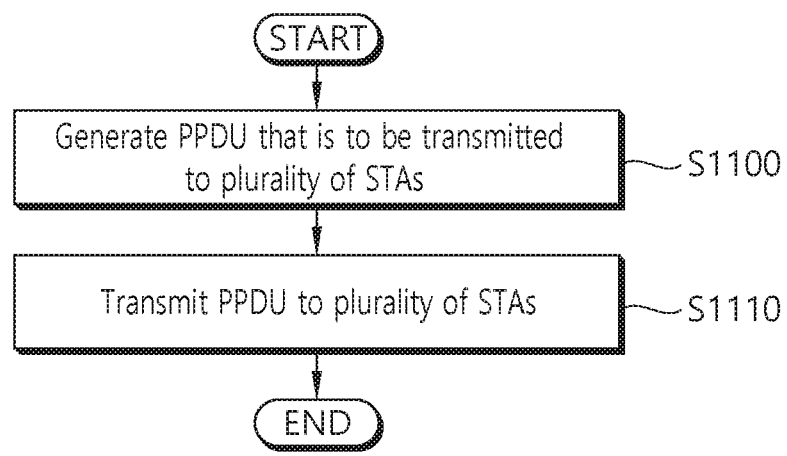
FIG. 11 is a flow chart illustrating a method for performing resource allocation by an AP according to an exemplary embodiment of the present invention.

FIG. 11 is a flow chart illustrating a method for performing resource allocation by an AP according to an exemplary embodiment of the present invention.

FIG. 11 discloses exemplary operations of the AP, which is described above, in FIG. 2 to FIG. 10, for performing resource allocation.

Referring to FIG. 11, the AP generates a PPDU that is to be transmitted to a plurality of STAs (step S1100).

The PPDU may include resource allocation information. The resource allocation information may include first resource unit allocation information for the allocation of first resource units and second resource unit allocation information for the allocation of second resource units. The first resource unit allocation information may correspond to information associated with the allocation of first resource units to at least one first STA that is to receive the PPDU through the first resource unit, among the plurality of STAs, within the entire frequency band. The second resource unit allocation information may correspond to information associated with the allocation of second resource units to at least one second STA that is to receive the PPDU through the second resource unit, among the plurality of STAs, within the entire frequency band. The number of tone being allocated to the first resource unit (e.g., 242-tone resource unit) may be greater than the number of tones being allocated to the second resource unit (e.g., 26-tone resource unit).

As described above, the second resource unit information may be generated based on a size of the entire bandwidth and a number of second resource units that can be allocated to remaining available tones after excluding the tones allocated to the first resource units. The tones allocated to the first resource units may be determined based on the first resource unit information.

Alternatively, the first resource unit information may be generated based on the number of first resource units that can be allocated in accordance with the size of the entire frequency band, and the second resource unit information may be generated based on the number of second resource units that can be allocated to the remaining available tones after excluding the tones allocated to the first resource units in accordance with the size of the entire frequency band.

The PPDU that is generated by the AP may further include receiving STA identification information, and the receiving STA identification information may sequentially include each of at least one set of first identification information corresponding to each of at least one first STA that is to receive the first resource unit and each of at least one set of second identification information corresponding to each of at least one second STA that is to receive the second resource unit.

The first resource unit allocation information may include information on the number of first resource units that are to be allocated to each of the at least one first STA sequentially corresponding to each of the at least one set of first identification information. And, the second resource unit allocation information may include information on the number of second resource units that are to be allocated to each of the at least one second STA sequentially corresponding to each of the at least one set of second identification information.

As described above, the first resource unit may be continuously allocated to each of the at least one first STA based on an order within the receiving STA identification information of the at least one set of first identification information within the entire frequency band. Also, the second resource unit may be continuously allocated to each of the at least one second STA based on an order within the receiving STA identification information of the at least one set of second identification information within the entire frequency band.

The AP transmits the PPDU to the plurality of STAs within the entire frequency band (step S1110).

Figure 12:
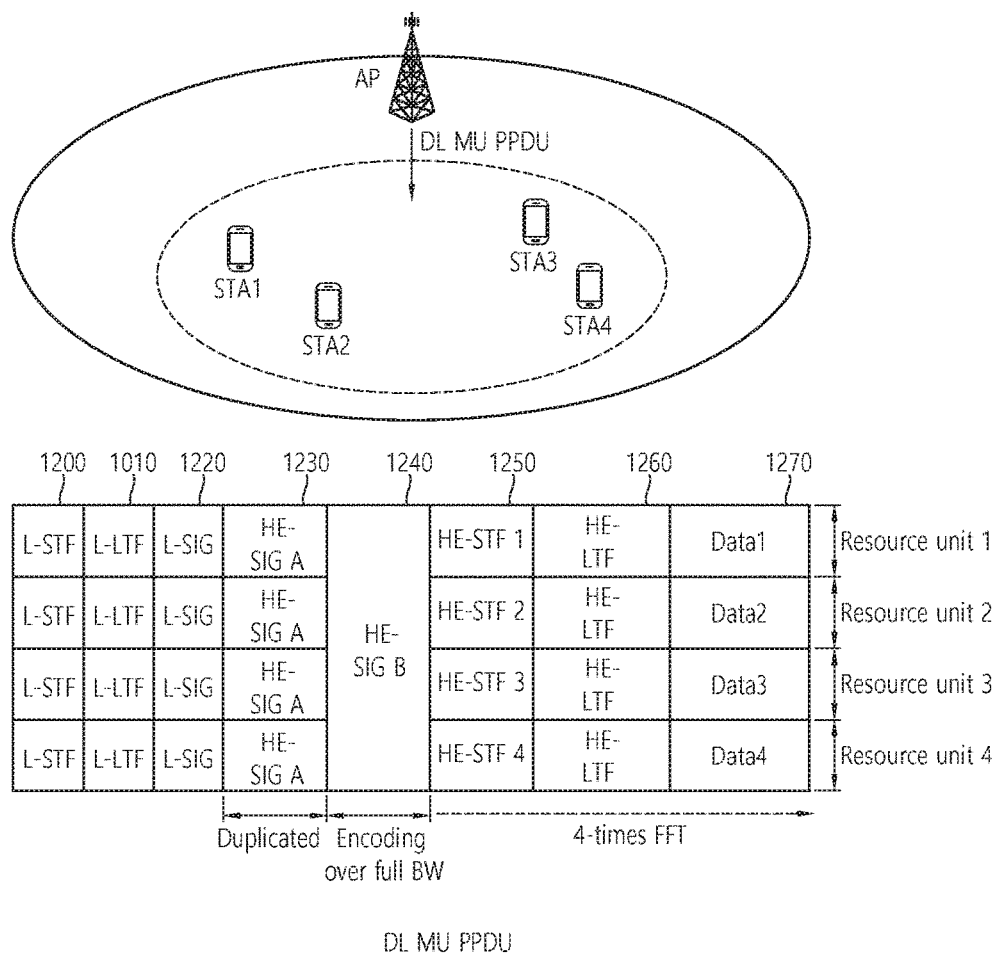
FIG. 12 is a conceptual view illustrating a DL MU PPDU format according to an exemplary embodiment of the present invention.

FIG. 12 is a conceptual view illustrating a DL MU PPDU format according to an exemplary embodiment of the present invention.

FIG. 12 discloses a DL U PPDU format that is transmitted by the AP based on OFDMA according to the exemplary embodiment of the present invention.

Referring to FIG. 12, a PPDU header of a DL MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part, which consists of a part after the L-SIG.

The L-STF 1200 may include a short training orthogonal frequency division multiplexing (OFDM) symbol. The L-STF 1200 may be used for frame detection, automatic gain control (AGC), diversity detection, and coarse frequency/time synchronization.

The L-LTF 1210 may include a long training orthogonal frequency division multiplexing (OFDM) symbol. The L-LTF 1210 may be used for fine frequency/time synchronization and channel prediction.

The L-SIG 1220 may be used for transmitting control information. The L-SIG 1220 may include information on data transmission rate, data length, and so on.

The HE-SIG A 1230 may also include identification information for indicating a target STA that is to receive the DL MU PPDU. For example, the HE-SIG A 1230 may include an identifier of a specific STA (or AP) that is to receive the PPDU and information for indicating a group of specific STAs. Also, in case the DL MU PPDU is transmitted based on OFDMA or MIMO, the HE-SIG A 1230 may also include resource allocation information for the reception of the DL MU PPDU by the STA.

Additionally, the HE-SIG A 1230 may also include color bits information for BSS identification information, bandwidth information, tail bit, CRC bit, modulation and coding scheme (MCS) information on the HE-SIG B 1240, information on the number of symbols for the HE-SIG B 1240, and cyclic prefix (CP) (or guard interval (GI)) length information.

The HE-SIG B 1240 may include information on a length modulation and coding scheme (MCS) of a physical layer service data unit (PSDU) for each STA and a tail bit, and so on. Additionally, the HE-SIG B 1240 may also include information on the STA that is to receive the PPDU and resource allocation information based on OFDMA (or MU-MIMO information). In case the resource allocation information based on OFDMA (or MU-MIMO information) is included in the HE-SIG B 1240, the resource allocation information may not be included in the HE-SIG A 1230.

As described above, the HE-SIG A 1250 or the HE-SIG B 1260 may include receiving STA identification information and resource allocation information. The receiving STA identification information may sequentially include a plurality of STAs that are to receive the PPDU, and the resource allocation information may sequentially include information on the number of resource units that are allocated to each of the plurality of STAs. The HE-SIG A 1250 or the HE-SIG B 1260 may include receiving STA identification information and resource allocation information for a first resource unit group (or first resource units) and receiving identification information and resource allocation information for a second resource unit group (or second resource units).

As described above, the HE-SIG A 1250 or the HE-SIG B 1260 may also directly indicate each of the first resource units and the second resource units that are being allocated to each of the plurality of STAs based on the bitmap information.

The fields before the HE-SIG B 1240 within the DL MU PPDU may each be transmitted from different transmission resources in a duplicated format. In case of the HE-SIG B 1240, the HE-SIG B 1240 being transmitted from part of the resource units (e.g., resource unit 1 and resource unit 2) may correspond to an independent field including separate information, and the HE-SIG B 1240 being transmitted from the remaining resource units (e.g., resource unit 3 and resource unit 4) may correspond to a duplicated format of the HE-SIG B 1240. which is transmitted from another resource unit (e.g., resource unit 1 and resource unit 2). Alternatively, the HE-SIG B 1240 may be transmitted in an encoded format within all of the transmission resources. And, the fields after the HE-SIG B 1240 may include separate information for each of the plurality of STAs receiving the PPDU.

The HE-STF 1250 may be used for enhancing automatic gain control estimation in a multiple input multiple output (MIMO) environment or an OFDMA environment.

More specifically, STA1 may receive HE-STF1, which is transmitted from the AP through resource unit1 and may then perform synchronization, channel tracking/estimation, and AGC, thereby being capable of decoding data field1 (or frame1). Similarly, STA2 may receive HE-STF2, which is transmitted from the AP through resource unit2 and may then perform synchronization, channel tracking/estimation, and AGC, thereby being capable of decoding data field2 (or frame2). STA3 may receive HE-STF3, which is transmitted from the AP through resource unit3 and may then perform synchronization, channel tracking/estimation, and AGC, thereby being capable of decoding data field3 (or frame3). And, STA4 may receive HE-STF4, which is transmitted from the AP through resource unit4 and may then perform synchronization, channel tracking/estimation, and AGC, thereby being capable of decoding data field4 (or frame4).

The HE-LTF 1260 may be used for estimating a channel in a MIMO environment or an OFDMA environment.

The inverse fast fourier transform (IFFT) size being applied to the HE-STF 1250 and the field after the HE-STF 1250 may be different from the IFFT size being applied to the field before the HE-STF 1250. For example, the IFFT size being applied to the HE-STF 1250 and the field after the HE-STF 1250 may be 4 times larger than the IFFT size being applied to the field before the HE-STF 1250. In case the STA may receive the HE-SIG A 1230 and may receive indication to receive a downlink PPDU based on the HE-SIG A 1230. In this case, the STA may perform decoding based on the HE-STF 1250 and the FFT size that is changed starting from the field after the HE-STF 1250. Conversely, in case the STA fails to receive indication to receive the downlink PPDU based on the HE-SIG A 1230, the STA may stop the decoding process and may perform network allocation vector (NAV) configuration. A cyclic prefix (CP) of the HE-STF 1250 may have a size that is larger than the CP of other fields, and, during such CP period, the STA may change the FFT size and may perform decoding on the downlink PPDU.

The access point (AP) may allocate each of the plurality of the resource units to each of the plurality of stations (STAs) within the entire bandwidth and may transmit individual data fields (or frames), which correspond to each of the plurality of STAs, to each of the plurality of STAs through each of the plurality of resource units. As described above, the information on the allocation of each of the plurality of resource units to each of the plurality of STAs may be included in the HE-SIG A 1250 or the HE-SIG B 1260.

Figure 13:
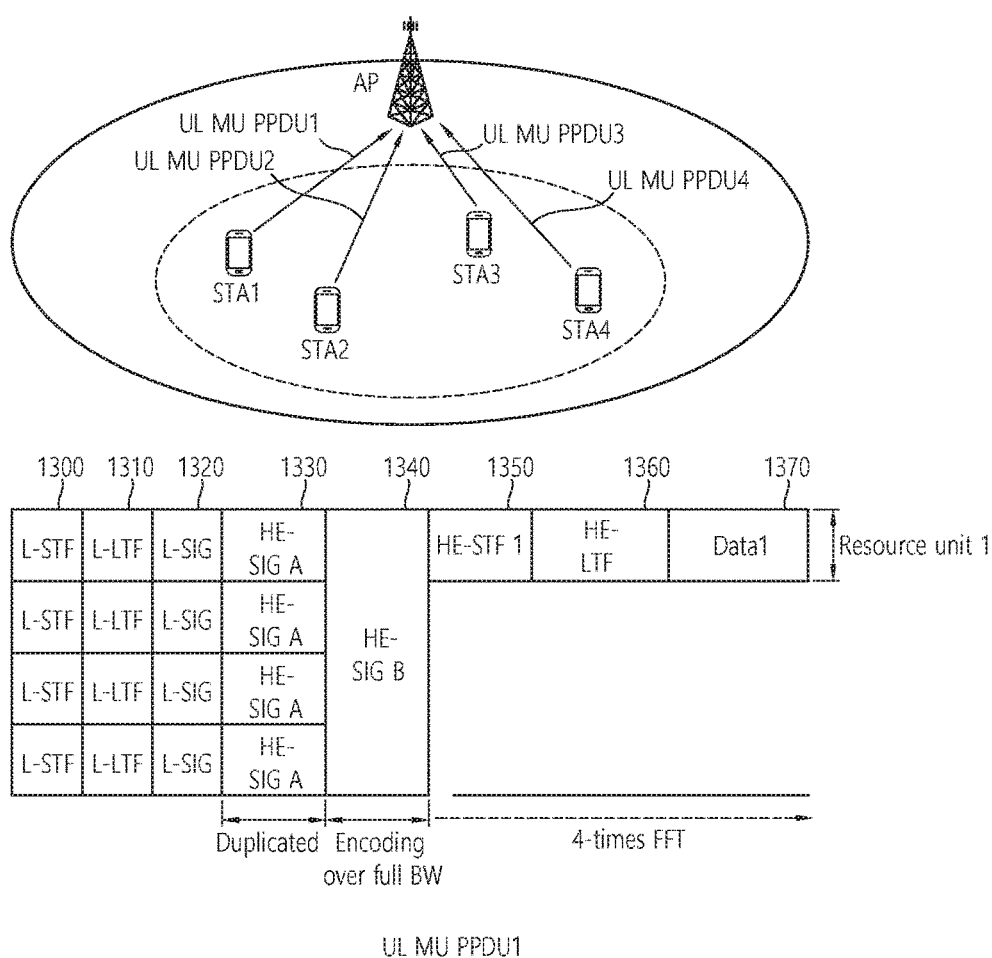
FIG. 13 is a conceptual view illustrating a transmission of a UL MU PPDU according to an exemplary embodiment of the present invention.

FIG. 13 is a conceptual view illustrating a transmission of a UL MU PPDU according to an exemplary embodiment of the present invention.

Referring to FIG. 13, a plurality of STAs may transmit a UL MU PPDU to the AP based on UL MU OFDMA.

The L-STF 1300, the L-LTF 1310, the L-SIG 1320, the HE-SIG A 1330, and the HE-SIG B 1340 may perform the functions, which are disclosed in FIG. 12. The information that is included in the signal field (L-SIG 1320, HE-SIG A 1330, and HE-SIG B 1340) may be generated based on the information included in the signal field of the received DL MU PPDU.

STA1 may perform uplink transmission through the entire bandwidth up to HE-SIG B 1340, and, then, STA1 may perform uplink transmission through the allocated bandwidth starting from HE-STF 1350. STA1 may deliver (or carry) an uplink frame through the allocated bandwidth (e.g., resource unit1) based on a UL MU PPDU. The AP may allocate an uplink resource corresponding to each of the plurality of STAs based on a DL MU PPDU (e.g., HE-SIG A/B), and each of the plurality of STAs may receive the corresponding uplink resource and then transmit a UL MU PPDU.

Figure 14:
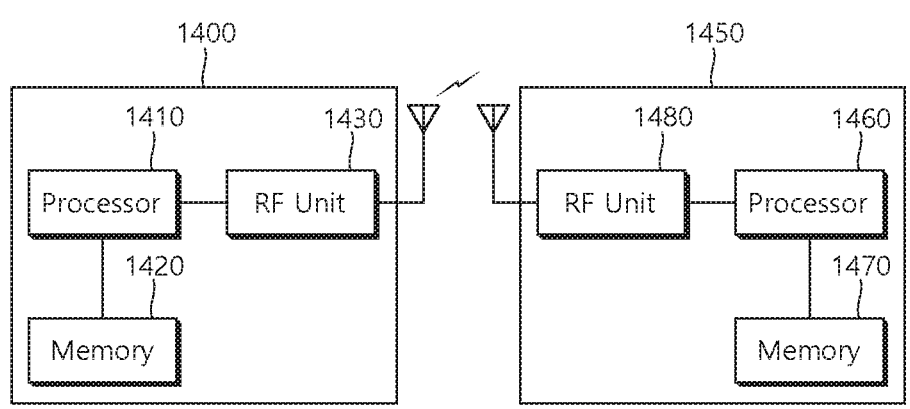
FIG. 14 is a block view illustrating a wireless device to which the exemplary embodiment of the present invention can be applied.

FIG. 14 is a block view illustrating a wireless device to which the exemplary embodiment of the present invention can be applied.

Referring to FIG. 14, as an STA that can implement the above-described exemplary embodiment, the wireless device 1400 may correspond to an AP 1400 or a non-AP station (STA) 1450.

The AP 1400 includes a processor 1410, a memory 1420, and a radio frequency (RF) unit 1430.

The RF unit 1430 is connected to the processor 1410, thereby being capable of transmitting and/or receiving radio signals.

The processor 1410 implements the functions, processes, and/or methods proposed in the present invention. For example, the processor 1410 may be implemented to perform the operations of the AP according to the above-described exemplary embodiments of the present invention. The processor may perform the operations of the AP, which are disclosed in the exemplary embodiments of FIG. 1 to FIG. 13.

For example, the processor 1410 may be configured to generate a PHY layer protocol data unit (PPDU) that is to be transmitted to a plurality of stations (STAs) and to transmit the generated PPDU to the plurality of STAs within the entire frequency band. At this point, the PPDU may include resource allocation information, and the resource allocation information may include first resource unit allocation information for the allocation of first resource units and second resource unit allocation information for the allocation of second resource units.

The first resource unit allocation information may correspond to information associated with the allocation of first resource units to at least one first STA that is to receive the PPDU through the first resource unit, among the plurality of STAs, within the entire frequency band. The second resource unit allocation information may correspond to information associated with the allocation of second resource units to at least one second STA that is to receive the PPDU through the second resource unit, among the plurality of STAs, within the entire frequency band.

Additionally, the PPDU may further include receiving STA identification information, and the receiving STA identification information may sequentially include each of at least one set of first identification information corresponding to each of at least one first STA and each of at least one set of second identification information corresponding to each of at least one second STA. In this case, the first resource unit allocation information may include information on the number of first resource units that are to be allocated to each of the at least one first STA sequentially corresponding to each of the at least one set of first identification information, and the second resource unit allocation information may include information on the number of second resource units that are to be allocated to each of the at least one second STA sequentially corresponding to each of the at least one set of second identification information.

The STA 1450 includes a processor 1460, a memory 1470, and a radio frequency (RF) unit 1480.

The RF unit 1480 is connected to the processor 1460, thereby being capable of transmitting and/or receiving radio signals.

The processor 1460 implements the functions, processes, and/or methods proposed in the present invention. For example, the processor 1460 may be implemented to perform the operations of the STA according to the above-described exemplary embodiments of the present invention. The processor may perform the operations of the STA, which are disclosed in the exemplary embodiments of FIG. 1 to FIG. 13.

For example, the processor 1460 may receive the PPDU and may then receive downlink data within the resource unit that is allocated based on the resource allocation information and the receiving STA identification information, which are included in the PPDU. The STA may be allocated with the first resource unit and/or the second resource unit based on the resource allocation information and the receiving STA identification information.

The processor 1410 and 1460 may include an application-specific integrated circuit (ASIC), another chip set, a logical circuit, a data processing device, and/or a converter converting a baseband signal and a radio signal to and from one another. The memory 1420 and 1470 may include a read-only memory (ROM), a random access memory (RAM), a flash memory, a memory card, a storage medium, and/or another storage device. The RF unit 1430 and 1480 may include one or more antennas transmitting and/or receiving radio signals.

When the exemplary embodiment is implemented as software, the above-described method may be implemented as a module (process, function, and so on) performing the above-described functions. The module may be stored in the memory 1420 and 1470 and may be executed by the processor 1410 and 1460. The memory 1420 and 1470 may be located inside or outside of the processor 1410 and 1460 and may be connected to the processor 1410 and 1460 through a diversity of well-known means.

What is claimed is:

1. A method for allocating resource units in a wireless local area network (WLAN), the method comprising:
generating, by an access point (AP), a physical (PHY) layer protocol data unit (PPDU) that is to be transmitted to a plurality of stations (STAs); and transmitting, by the AP, the PPDU to the plurality of STAs within an entire frequency bandwidth, wherein the PPDU includes resource allocation information, wherein the resource allocation information includes first resource unit allocation information for allocation of first resource units and second resource unit allocation information for allocation of second resource units, wherein the first resource unit allocation information relates to information associated with allocation of the first resource units for at least one first STA that is to receive the PPDU, among the plurality of STAs, through the first resource unit within the entire frequency bandwidth, wherein the second resource unit allocation information relates to information associated with allocation of the second resource units for at least one second STA that is to receive the PPDU, among the plurality of STAs, through the second resource unit within the entire frequency bandwidth, wherein a number of tones being allocated to the first resource unit is greater than a number of tones being allocated to the second resource unit, wherein, in case a size of the entire frequency bandwidth is equal to 20 MHz, the first resource allocation information includes information on whether or not one of the first resource units is allocated within the entire bandwidth based on a 1-bit signaling bit, wherein, in case a size of the entire frequency bandwidth is equal to 40 MHz, the first resource allocation information includes information on whether or not zero, one, or two of the first resource units is/are allocated within the entire bandwidth based on a 2-bit signaling bit, and wherein, in case a size of the entire frequency bandwidth is equal to 80 MHz, the first resource allocation information includes information on whether or not one, two, or four of the first resource units is/are allocated within the entire bandwidth based on a 2-bit signaling bit.

2. The method of claim 1, wherein the first resource unit relates to a 242-tone resource unit, wherein the second resource unit relates to a 26-tone resource unit, wherein the second resource unit information is generated based on a size of the entire frequency band and a number of second resource units capable of being allocated within remaining available tones after excluding tones allocated being to the first resource unit, and wherein the tones being allocated to the first resource unit are determined based on the first resource unit information.

3. The method of claim 1, wherein the first resource unit allocation information is generated based on a number of the first resource units capable of being allocated in accordance with a size of the entire frequency band, wherein the second resource unit allocation information is generated based on a number of second resource units capable of being allocated to remaining available tones after excluding the tone allocated to the first resource units in accordance with the size of the entire frequency bandwidth, and wherein the tones being allocated to the first resource unit are determined based on the first resource unit information.

4. The method of claim 1, wherein the PPDU further includes receiving STA identification information, wherein the receiving STA identification information sequentially includes each of at least one set of first identification information for each of at least one first STA and each of at least one set of second identification information for each of at least one second STA, wherein the first resource unit allocation information includes information on the number of first resource units that are to be allocated to each of the at least one first STA sequentially related to each of the at least one set of first identification information, and wherein the second resource unit allocation information includes information on the number of second resource units that are to be allocated to each of the at least one second STA sequentially related to each of the at least one set of second identification information.

5. The method of claim 4, wherein the first resource unit is contiguously allocated to each of the at least one first STA based on an order within the receiving STA identification information of the at least one set of first identification information within the entire frequency band, and wherein the second resource unit is contiguously allocated to each of the at least one second STA based on an order within the receiving STA identification information of the at least one set of second identification information within the entire frequency band.

6. An access point (AP) for allocating resource units in a wireless local area network (WLAN), the AP comprising:

a transceiver configured to transmit and receive radio signals; and a processor being operatively connected to the transceiver, wherein the processor is configured to:

generate a physical (PHY) layer protocol data unit (PPDU) that is to be transmitted to a plurality of stations (STAs), and control the transceiver to transmit the PPDU to the plurality of STAs within an entire frequency bandwidth, wherein the PPDU includes resource allocation information, wherein the resource allocation information includes first resource unit allocation information for allocation of first resource units and second resource unit allocation information for allocation of second resource units, wherein the first resource unit allocation information relates to information associated with allocation of the first resource units for at least one first STA that is to receive the PPDU, among the plurality of STAs, through the first resource unit within the entire frequency bandwidth, wherein the second resource unit allocation information relates to information associated with allocation of the second resource units for at least one second STA that is to receive the PPDU, among the plurality of STAs, through the second resource unit within the entire frequency bandwidth, wherein a number of tones being allocated to the first resource unit is greater than a number of tones being allocated to the second resource unit, wherein, in case a size of the entire frequency bandwidth is equal to 20 MHz, the first resource allocation information includes information on whether or not one of the first resource units is allocated within the entire bandwidth based on a 1-bit signaling bit, wherein, in case a size of the entire frequency bandwidth is equal to 40 MHz, the first resource allocation information includes information on whether or not zero, one, or two of the first resource units is/are allocated within the entire bandwidth based on a 2-bit signaling bit, and wherein, in case a size of the entire frequency bandwidth is equal to 80 MHz, the first resource allocation information includes information on whether or not one, two, or four of the first resource units is/are allocated within the entire bandwidth based on a 2-bit signaling bit.

7. The AP of claim 6, wherein the first resource unit relates to a 242-tone resource unit, wherein the second resource unit relates to a 26-tone resource unit, wherein the second resource unit information is generated based on a size of the entire frequency band and a number of second resource units capable of being allocated within remaining available tones after excluding tones allocated being to the first resource unit, and wherein the tones being allocated to the first resource unit are determined based on the first resource unit information.

8. The AP of claim 6, wherein the first resource unit allocation information is generated based on a number of the first resource units capable of being allocated in accordance with a size of the entire frequency band, wherein the second resource unit allocation information is generated based on a number of second resource units capable of being allocated to remaining available tones after excluding the tone allocated to the first resource units in accordance with the size of the entire frequency bandwidth, and wherein the tones being allocated to the first resource unit are determined based on the first resource unit information.

9. The AP of claim 6, wherein the PPDU further includes receiving STA identification information, wherein the receiving STA identification information sequentially includes each of at least one set of first identification information for each of at least one first STA and each of at least one set of second identification information for each of at least one second STA, wherein the first resource unit allocation information includes information on the number of first resource units that are to be allocated to each of the at least one first STA sequentially related to each of the at least one set of first identification information, and wherein the second resource unit allocation information includes information on the number of second resource units that are to be allocated to each of the at least one second STA sequentially related to each of the at least one set of second identification information.

10. The AP of claim 9, wherein the first resource unit is contiguously allocated to each of the at least one first STA based on an order within the receiving STA identification information of the at least one set of first identification information within the entire frequency band, and wherein the second resource unit is contiguously allocated to each of the at least one second STA based on an order within the receiving STA identification information of the at least one set of second identification information within the entire frequency band.

* * * * *